G. W. Brown.
No. 508.
Corn Planter.
Reissued Nov. 10, 1857.
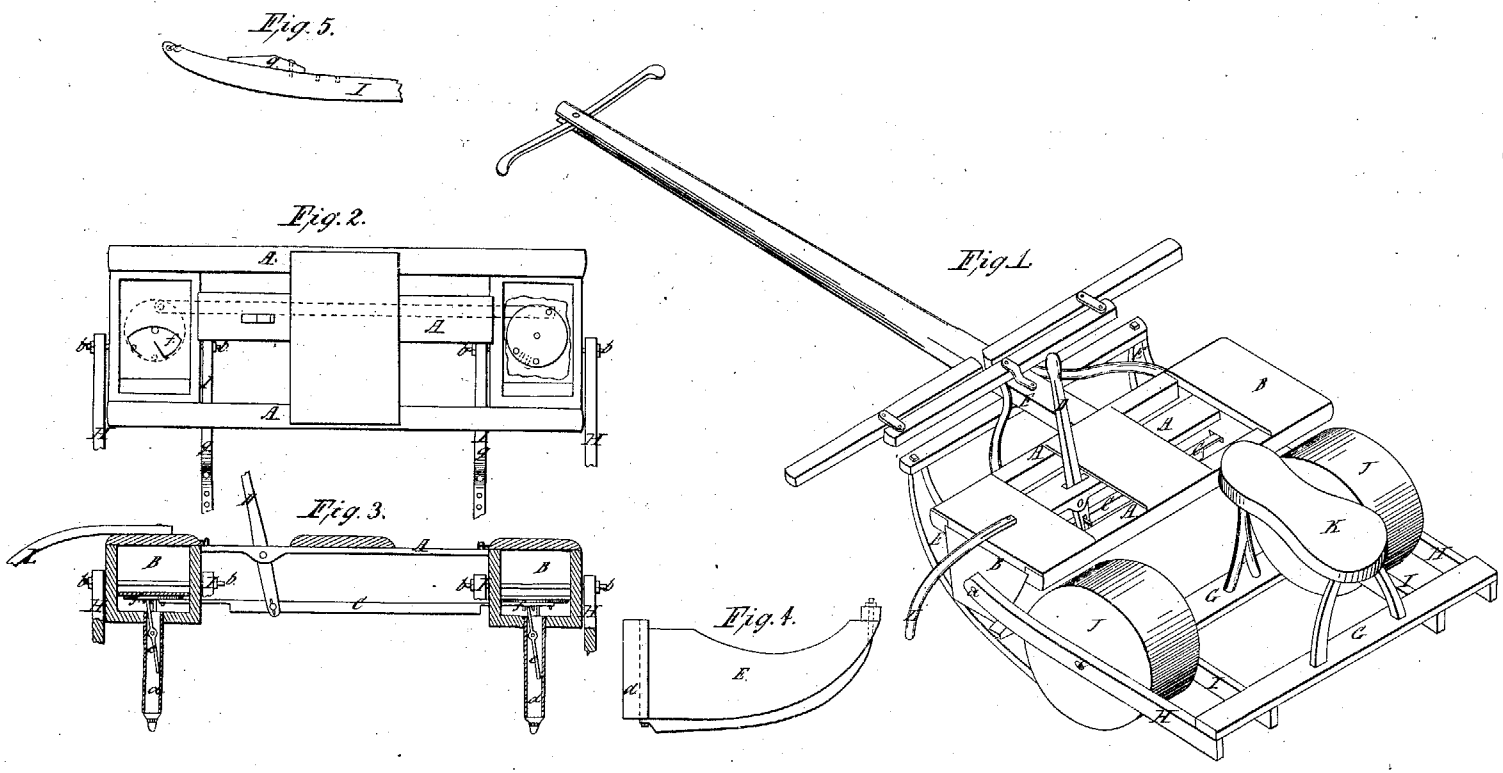

UNITED STATES PATENT OFFICE.

GEORGE W. BROWN, OF GALESBURG, ILLINOIS.

IMPROVEMENT IN SEED-PLANTERS.

Specification forming part of Letters Patent No. 12,811, dated May 8, 1855; Reissue No. 508, dated November 10, 1857.

*To all whom it may concern:*

Be it known that I, GEORGE W. BROWN, of Galesburg, in the county of Knox and State of Illinois, have invented certain new and useful Improvements in Seed-Planters; and I do hereby declare the following to be a full, clear, and exact description of the same, reference being had to the accompanying drawings, in which—

Figure 1 represents a perspective view of the machine. Fig. 2 represents a top plan of the front part of the machine with the covers of the seed-hoppers removed. Fig. 3 represents a vertical section taken through the red line *x x* of Fig. 2. Fig. 4 represents one of the runners detached, and Fig. 5 represents one of the supporting-hinged pieces not distinctly shown in the other figures.

Similar letters of reference, where they occur in the several figures, denote like parts of the machine in all of them.

The nature of my invention relates to the combination of the driver's seat with the two frames hinged together, so that the driver, placed behind the axle of the supporting-wheels, may use the rear frame as a lever in connection with his own weight for raising or lowering the front frame which carries the seeding apparatus, for the purpose of raising them out of or throwing them into the ground, as circumstances may require.

To enable others skilled in the art to make and use my invention, I will proceed to describe the same with reference to the drawings.

The front frame, A, carries the seed-hoppers B, seed-slide C, and lever D for operating it.

E E are runner-shaped shoes for cutting and opening the furrows into which the seeds are to be dropped. These shoes are united at their points by a cross-piece, F, and by their rear portions to the frame A.

G is a second frame, pivoted to the first-named frame A by its pieces H H and I I, pivoted to the seed-box on the front frame at the point *a*, as seen more distinctly in Figs. 2, 3, where *b* represents the rod by which these four arms are pivoted or hinged to the front frame. The object of this hinged joint between the two frames is that each frame may have a motion independent of the other, but at the same time controlled by the driver on his seat behind the axle of the rear frame.

J J are two supporting and covering wheels, hung by their axles *c* to the rear frame, G. Behind the line of the axles or journals of the wheels J is located the driver's seat K. This seat has sufficient length to allow the driver to change his position thereon, and cause the frame G, with the axles of the supporting-wheels J as fulcra, to act as a lever in raising up or throwing down the front frame with its shoes and seeding apparatus, and thus place these parts entirely under the control of the driver, who, by simply shifting his weight, makes the rear frame a lever to the front one. Were it not for some simple means of raising these runner-shaped shoes, the machine could not be turned around without breaking it; but the driver, by moving himself backward on the seat, causes the rear frame to act as a lever in raising the front frame up and the shoes out of the ground, and by moving himself forward on the seat causes his weight to aid in forcing the shoes into the soil and hold them there.

*d* are the openings through the rear of the shoes for the seed to pass through into the furrow opened by said shoe.

*e* is a valve in said opening to hold and then to drop the charge of seed.

*f* is the seeding-wheel within the hopper for conveying the seed from said hopper into the openings or tubes *d* through the shoe.

L is a pointer, to enable the operator to see when the tube is over the proper place for depositing the seed and to let him know when to open the valve *e* to keep the planting in rows.

The arms I I, Fig. 5, have upon that part of them which passes under the front frame (see Fig. 2) adjustable wedges *g g*, which can be slipped farther under or drawn back, so as to set the front frame and its shoes at an approximate height or depth, which, as before stated, is varied by the driver on his seat, as circumstances may require.

Having thus fully described the nature and object of my invention, what I claim therein as new, and desire to secure by Letters Patent, is—

In combination with the hinged frames or hinge-joint, the locating of the conductor's or driver's seat in rear of the supporting-axle, so that as he moves forward or back on his seat the rear frame may act as a lever for lowering or raising the seeding part of the machine, and thus throw it into or out of the ground, as circumstances may require, in turning around or for passing over any obstruction, substantially as set forth.

GEO. W. BROWN.

Witnesses:
A. B. STOUGHTON,
THOS. H. UPPERMAN.